May 1, 1951     T. O. BOKICH     2,551,312
FILTER BAG AND SYSTEM
Filed Sept. 13, 1947
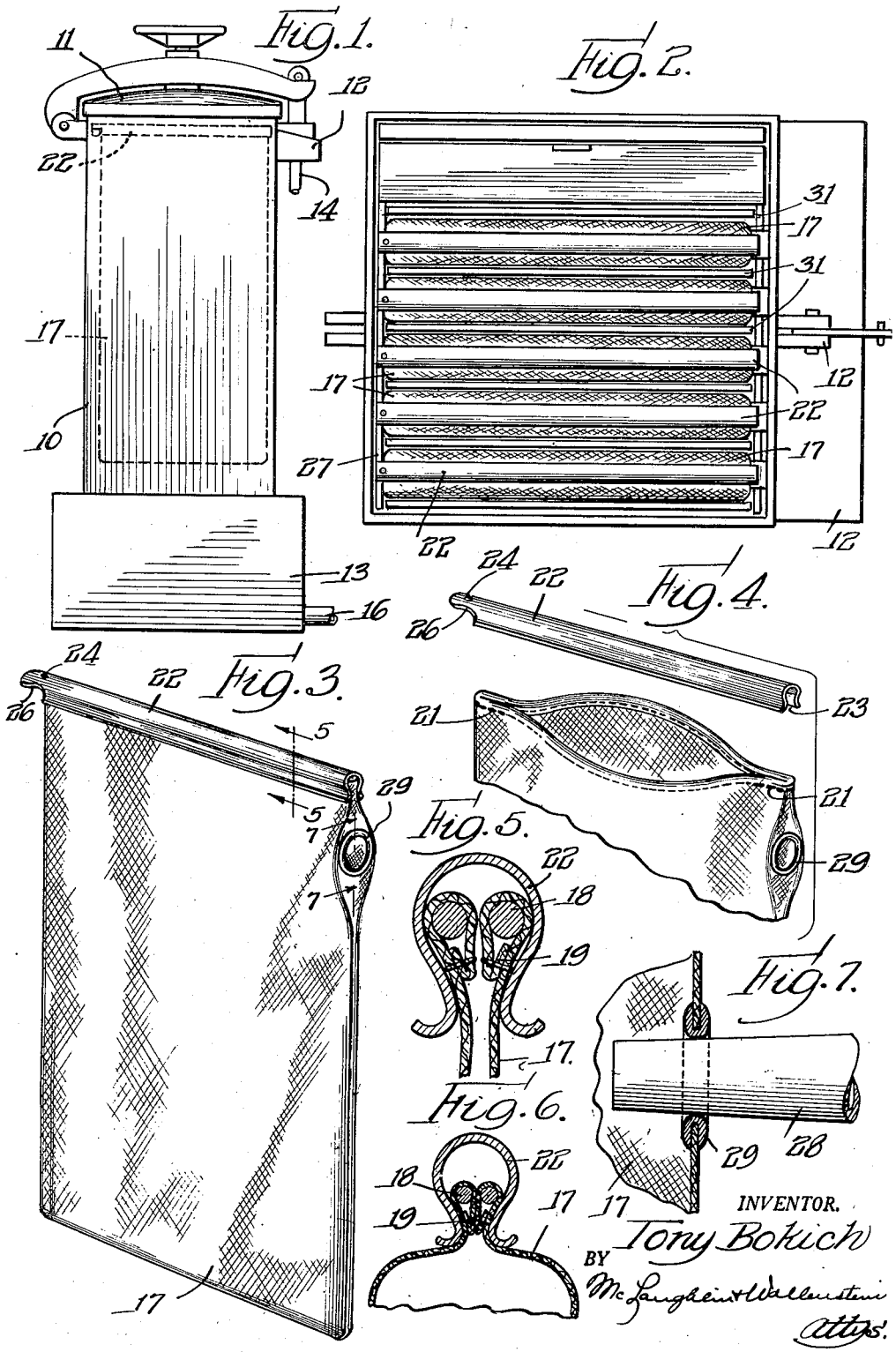
INVENTOR.
Tony Bokich Patented May 1, 1951

2,551,312

UNITED STATES PATENT OFFICE 2,551,312

FILTER BAG AND SYSTEM

Tony O. Bokich, Gary, Ind.

Application September 13, 1947, Serial No. 773,906

4 Claims. (Cl. 210—190)

My invention relates to filter systems and a filter bag for use with such systems.

In the dry cleaning industry, the cleaning solution, which may comprise any suitable solvent such as naphtha, benzine, carbon tetrachloride, mixtures of the same, or the like, is regenerated, after being used, so that it may again be employed in a cleaning operation. Regenerating systems involve filtering and so far as I know no fully satisfactory filtering equipment has heretofore been made available. A simple filtering system, and one which has been suggested in the art, involves the use of filtering bags, but so far as I know such systems have left much to be desired, for reasons known in the art. One problem has been the bags frequently break or, because of their manner of support or construction, release some of their contents and thereby contaminate all of the filtered cleaning solution which has been treated up to the time of breakage. I have also found that the filtering bags heretofore utilized would sometimes last no more than a week with the average period of use no more than two or three weeks per bag. If the bags are supported so as to leave their entire exterior surface unobstructed and thereby to obtain greater efficiency because of the greater amount of filtering surface, expensive but still unsuccessful constructions have resulted. When a normal size bag is full of cleaning solution and also has substantially a complete charge of debris resulting from a filtering operation, the total weight will be in excess of 150 pounds and the tendency toward sagging, with usual methods of support, is very great.

The principal object of my invention is the provision of an improved filter system and filter bag for use therewith.

Another object is the provision of a filter bag construction which obviates some of the usual problems heretofore associated with the use of such equipment.

Another object is greatly to improve the efficiency and increase the life of filter bags used in systems for treating dry cleaning solutions and the like.

In carrying out my invention, I provide a filter bag which is opened at one end, but otherwise closed, and has its two edges adjacent the opening beaded. The beaded end of the filter bag is engaged by a closure clamp of generally tubular cross section so constructed and arranged that pressure caused by the weight of the bag and expansion thereof due to pressure serves to increase the force closing the bag rather than releasing the same and spilling the contents of the bag. The closure clamp also comprises a suspension bar for supporting the entire bag structure and a metal eyelet in the nature of a grommet provides means for the introduction of a tapered nozzle through which the filterable solution is introduced. The bags are suspended in multiple in a filter housing and the cleaning solution is collected at the bottom of the housing and suitably delivered to storage or for immediate further cleaning use.

Other objects and specific features of the invention will be apparent from a consideration of the following detailed description taken with the accompanying drawings wherein—

Fig. 1 is a side elevational view partly broken away, showing a complete filter unit;

Fig. 2 is a fragmentary plan view with the cover removed;

Fig. 3 is a perspective view of the filter bag and its closure as it appears when removed from the filter compartment;

Fig. 4 is a fragmentary perspective view showing the closure clamp removed from the bag and the filter bag open at the top;

Fig. 5 is an enlarged fragmentary sectional view taken on the line 5—5 of Fig. 3;

Fig. 6 is a view similar to Fig. 5 but showing the position of the filter bag when the same is distended during a filtering operation; and Fig. 7 is an enlarged fragmentary sectional view taken on the line 7—7 of Fig. 3, a filter nozzle being shown in the position which it occupies during a filtering operation.

Referring now to the drawing, I employ a filter tank 10 with suitable cover 11, distributing manifold 12, and filtrate header 13. Solvent to be filtered is introduced to the manifold through pipe 14, is delivered to and through a plurality of filter bags as will be described, flows to the header 13 and thence is drawn through a pipe 16 to a point desired.

The filter bags 17 are preferably formed of relatively heavy duck or other canvas like material and have their margins brought together by being folded once to form a bag which is closed except at the top where an end slit is retained. The top edges are beaded, as by introducing a rope 18 along the edges and sewing the same at 19 to enclose the rope and thereby leave a beaded edge of the type desired. A portion of the top slit near the edges is slightly closed by sewing as at 21, so that the bag may be distended and opened at its center as shown in Fig. 4.

To hold the filter bag top edge opening in closed position, I provide a generally tubular closure clamp 22 with a slit 23 (Fig. 4) extending the full length of the closure clamp through which the two sides of the filter bag extend. The edges of the closure clamp adjacent the slit are outflared so that when the bag is distended, as shown in Figs. 2 and 6, the outflared portion generally fits the contiguous flared portion of the bag and there is no possibility of cutting the bag. The closure is applied by engaging the beaded portion of the bag at one end thereof and sliding the closure clamp longitudinally to position. To facilitate removal of the closure clamp, an aperture 24 is provided at one end thereof for the insertion of a hook or like tool. Below the aperture 24, the closure clamp is cut away to form a lip 26 adapted to engage on a rail 27 within the filter tank to hold the bag and contents up at one side thereof.

A number of tapered nozzles 28, one for each filter bag, projects from the manifold 12 to the interior of the filter tank. One edge of the filter bag is provided with a metal eyelet 29 in the nature of a grommet to receive the tapered nozzle 28 for the introduction of filterable liquid within the filter bag. While means other than the nozzle 28 may be provided to support the filter bag, I have found that with such a nozzle at one end and the rail 27 at the other end the bag is supported against collapsing and gives full satisfaction during all operations involved in its use.

I have not attempted to show all details of the filter unit but only those which have to do with the present invention. I do show, however, a number of screens 31 disposed between the bags to assure holding them separate from each other and affording the maximum filtering area for each bag.

When employing the filter system and bags of my present invention, the clean bags are assembled with their closure clamps as shown in Fig. 3 and the bags so prepared are mounted in the filter tank by extending the nozzle 28 through the grommet 29 and engaging the lip 26 above the rail 27. The filter tank is closed and filterable liquid introduced to the manifold 12. When the closure clamp is first introduced, it has the general relationship to the bag shown in Fig. 5. When liquid is introduced to the bag, the beaded edges are pulled down tightly toward the slit 23 and the edges are forced into tight engagement to thoroughly seal the edge opening of the bag. The distention of the bag also causes the grommet to be forced against the taper of the nozzle 28 so that the pressure, instead of tending to release debris within the filter bag actually closes all openings more tightly and prevents loss of material therefrom, except for the liquid which flows through the material comprising the filter bag. A unit such as shown may be operated sometimes for as long as a week, the exact time depending upon the amount of soil removed in the filtering operation. In any case, the filtering operation may continue until the bag is, for all practical purposes, full, and I have found that in a bag approximately 24 inches long and 16 inches wide about 15 pounds of solid material may be collected in the bag before servicing the same. When the unit has been operated a sufficient length of time to require changing of bags, the flow of filterable solution is interrupted, and the bags are lifted up by engaging the closure clamp, the closure clamp is removed and placed on a fresh bag, and the fresh bag returned to the filter tank for a new cycle of operations. In fact, only a very few minutes' time is required to make the change. The residue material in a removed bag is dumped and the bag may then be introduced into a usual soap and water type washing machine and washed just like any other cloth material is washed. Experience which I have had so far indicates that bags employing the features of my invention may last well in excess of a year without repair or replacement when treated in the manner explained. Such bags are made of the same fabric material as bags heretofore lasting two or three weeks, and as a rule the latter were required to be dry cleaned instead of being washed, this being necessary because of appurtenances used in connection therewith which would not permit the filter bag to be introduced into a regular wet laundry appliance.

What I claim as new and desire to protect by Letters Patent of the United States is:

1. A filter bag of the character described, comprising a generally rectangular fabric bag member closed at its bottom and sides, a rope secured within overlapped top edges to form a beaded top portion, the beaded portion being secured for a short distance at each end thereof leaving a center slit whereby to permit closure by a closure clamp, said closure clamp being in the form of a rounded channel having an elongated mouth opening of restricted width and with outflaring edges at its aforesaid mouth, and an eyeleted aperture on one side of the bag, near the top thereof, for insertion of a nozzle for carrying filterable liquid material.

2. A filter bag of the character described, comprising a generally rectangular fabric bag member closed at its bottom and sides, a rope secured within overlapped top edges to form a beaded top portion, the beaded portion being secured for a short distance at each end thereof leaving a center slit whereby to permit closure by a closure clamp, said closure clamp comprising a member of a length greater than the width of said bag, said closure clamp being in the form of a rounded channel having an elongated mouth opening of restricted width and with outflaring edges at its aforesaid mouth, an end of said closure clamp being cut away so as to form a lip for engagement on a rail or the like to support the bag, and an eyeleted aperture on one side of the bag, near the top thereof, for insertion of a nozzle for carrying filterable liquid material.

3. A filter bag of the character described, comprising a generally rectangular fabric bag member closed at its bottom and sides, the top of said bag defining the open mouth thereof having beaded edge portions, the beaded portions being adapted to be secured by a closure clamp, said closure clamp comprising a member of a length greater than the width of said bag, said closure clamp being in the form of a rounded channel having an elongated mouth opening of restricted width and with outflaring edges at its aforesaid mouth, an end of said closure clamp forming a lip for engagement on a rail or the like to support the bag, and an eyeleted aperture on one side of the bag, near the top thereof, for insertion of a nozzle for carrying filterable liquid material.

4. In a filter system, a generally rectangular fabric filter bag closed at its bottom and sides, the top edges at the open mouth of said bag being beaded, an eyeleted aperture at one side of the bag near the top thereof through which a tapered nozzle carrying filterable liquid material is adapted to be inserted and held frictionally therein, a closure clamp of generally tubular cross section having an elongated slit of restricted width and with outflaring edges, said closure clamp being of greater length than the width of said bag, said beaded portion being held within the tubular closure clamp whereby to increase the closure action when pressure is developed within said filter bag, a filter tank, means for supporting a number of said filter bags within the tank, said supporting means on one side comprising an extension on one end of said closure clamp and a rail mounted on said tank upon which said extension is adapted to rest, and, on the other side, comprising said nozzle extending into said eyeleted aperture in said filter bag.

TONY O. BOKICH.

REFERENCES CITED

The following references are of record in the file of this patent:

| Number | Name | Date |
|---|---|---|
| 1,693,717 | Liensch | Dec. 4, 1928 |
| 1,738,114 | Olson | Dec. 3, 1929 |
| 1,753,458 | Willis | Apr. 8, 1930 |
| 1,881,086 | Marshall | Oct. 4, 1932 |
| 2,003,720 | Meek | June 4, 1935 |
| 2,347,177 | Dow | Apr. 25, 1944 |